US009682336B2

(12) United States Patent
Lucas et al.

(10) Patent No.: US 9,682,336 B2
(45) Date of Patent: Jun. 20, 2017

(54) IMPACT MOISTURE SEPARATOR

(71) Applicant: Ingersoll-Rand Company, Davidson, NC (US)

(72) Inventors: Michael John Lucas, Mooresville, NC (US); Charles John Bergh, Berwyn, PA (US); Willie Dwayne Valentine, Statesville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 214 days.

(21) Appl. No.: 14/289,456

(22) Filed: May 28, 2014

(65) Prior Publication Data
US 2015/0343355 A1 Dec. 3, 2015

(51) Int. Cl.
| | | |
|---|---|---|
| *B01D 45/00* | (2006.01) | |
| *B01D 45/06* | (2006.01) | |
| *B01D 50/00* | (2006.01) | |
| *B01D 45/16* | (2006.01) | |
| *B01D 45/08* | (2006.01) | |
| *F01M 13/04* | (2006.01) | |

(52) U.S. Cl.
CPC ............ *B01D 45/06* (2013.01); *B01D 45/08* (2013.01); *B01D 45/16* (2013.01); *B01D 50/002* (2013.01); *F01M 13/04* (2013.01); *F01M 2013/0433* (2013.01)

(58) Field of Classification Search
CPC ...... B01D 45/06; B01D 45/08; B01D 50/002; B01D 45/16; B01D 45/12; F01M 13/04; F01M 2013/0433; Y10S 55/03; A47L 9/1683
See application file for complete search history.

(56) References Cited

U.S. PATENT DOCUMENTS

| | | | |
|---|---|---|---|
| 718,805 A | * | 1/1903 | Watts ..................... B01D 45/08 55/423 |
| 846,034 A | | 3/1907 | Kieley et al. |

(Continued)

FOREIGN PATENT DOCUMENTS

| | | |
|---|---|---|
| DE | 102011111451 | 2/2013 |
| EP | 0272765 A1 | 6/1988 |
| WO | 2010143978 A1 | 12/2010 |

OTHER PUBLICATIONS

European Patent Office, Extended Search Report issued in corresponding Application No. 15169561.6, dated Feb. 9, 2016.

*Primary Examiner* — Dung H Bui
(74) *Attorney, Agent, or Firm* — Taft Stettinius & Hollister (57) ABSTRACT

An impact moisture separator for separating a liquid moisture from a compressed gas. The impact moisture separator includes a plurality of impact plates that are positioned within the inner region of the separator and may be downstream of at least one strut. The strut may be configured to disperse the flow of compressed gas. The impact plates each have a plurality of vanes that extend beyond a plate portion of the impact plates. The vanes are configured to provide a passage for the flow of compressed gases and are offset from the vanes of the adjacent, successive impact plate. Further, the impact plates and strut(s) are tilted toward the incoming flow of compressed gas so as to assist in influencing the downward flow of the compressed gas, and thereby facilitate the flow of separated liquid moisture toward a reservoir of the housing.

20 Claims, 7 Drawing Sheets

(56) References Cited

U.S. PATENT DOCUMENTS

| | | | | |
|---|---|---|---|---|
| 1,351,433 A * | 8/1920 | Nelis | ...................... | F22B 37/303 122/491 |
| 1,533,501 A * | 4/1925 | Hughes | .................. | B01D 45/16 55/397 |
| 1,630,748 A * | 5/1927 | Kirkpatrick | ............ | B01D 45/08 196/139 |
| 1,761,168 A * | 6/1930 | Andrews | ................. | F22B 37/30 55/444 |
| 1,910,728 A * | 5/1933 | Waters | ............... | B01D 19/0042 55/444 |
| 1,926,262 A * | 9/1933 | Campbell | .............. | B01D 45/08 55/324 |
| 2,083,764 A * | 6/1937 | Weisgerber | ............ | B01D 45/08 55/322 |
| 2,157,305 A * | 5/1939 | Gwynne | ................ | B01D 45/08 55/318 |
| 2,358,508 A * | 9/1944 | Hersh | .................... | B01D 45/08 55/399 |
| 2,655,905 A * | 10/1953 | Rehm | .................... | F22B 37/265 122/459 |
| 2,846,024 A * | 8/1958 | Bremi | ....................... | B04C 5/04 55/413 |
| 2,894,599 A * | 7/1959 | Leininger | .............. | B01D 45/02 55/325 |
| 3,240,001 A * | 3/1966 | Kuhn | ..................... | B01D 45/06 55/392 |
| 3,266,224 A * | 8/1966 | Ferretti | ................ | B01D 47/028 55/446 |
| 3,813,855 A | 6/1974 | Hill et al. | | |
| 3,822,533 A * | 7/1974 | Oranje | ..................... | B04C 5/103 55/394 |
| 3,876,396 A * | 4/1975 | Arnold | ..................... | B01D 47/06 261/118 |
| 4,035,171 A * | 7/1977 | Reed | ...................... | B01D 50/00 55/319 |
| 4,300,918 A | 11/1981 | Cary | | |
| 4,388,190 A | 6/1983 | Haddock | | |
| 4,732,585 A * | 3/1988 | Lerner | ................... | B01D 45/08 165/159 |
| 4,889,624 A | 12/1989 | Soriente et al. | | |
| 4,938,787 A * | 7/1990 | Simmerlein-Erlbacher | ......................... | B01D 39/1676 95/198 |
| 5,031,693 A | 7/1991 | VanDyke | | |
| 5,041,146 A | 8/1991 | Simmerlein-Erlbacher | | |
| 6,083,302 A * | 7/2000 | Bauver, II | ............. | B01D 45/08 55/440 |
| 7,044,999 B2 * | 5/2006 | Bankstahl | ................ | B23K 7/10 55/426 |
| 7,618,472 B2 | 11/2009 | Agnello et al. | | |
| 7,867,310 B2 * | 1/2011 | Baten | ..................... | B01D 45/16 55/385.1 |
| 7,938,875 B2 * | 5/2011 | Son | .................... | F01M 13/0011 123/198 E |
| 7,947,123 B2 * | 5/2011 | Kwok | ................. | F24C 15/2035 126/299 C |
| 7,988,756 B2 * | 8/2011 | Fujiyama | ............... | B01D 45/12 55/337 |
| 8,444,732 B2 | 5/2013 | Bratton | | |
| 8,764,886 B2 * | 7/2014 | Halpap | .................. | B01D 45/12 55/315 |
| 8,852,307 B2 * | 10/2014 | Sikkenga | ............... | B01D 45/08 55/434.2 |
| 2003/0150198 A1 * | 8/2003 | Illingworth | ............... | A47L 5/24 55/406 |
| 2004/0025483 A1 * | 2/2004 | Norman | .................. | B01D 45/06 55/444 |
| 2004/0107682 A1 * | 6/2004 | Letzel | ................... | B01D 1/305 55/444 |
| 2015/0135661 A1 * | 5/2015 | MacDonald | .......... | F24F 13/082 55/440 |

\* cited by examiner

IMPACT MOISTURE SEPARATOR

BACKGROUND

Gases that are compressed in a compressor chamber of a compressor unit typically contain moisture, such as, for example, water, that is in a liquid state. As described by physical gas laws, the temperature of a gas, such as air, typically increases as the gas is compressed. Such increases in gas temperature may cause the liquid moisture that is in the gas to change to a vapor state. After being released from a compression chamber of the compressor unit, compressed gas, and the water vapor contained therein, is often delivered to an after-cooler. As the temperatures of the compressed gas and water vapor are cooled in the after-cooler, the previously vaporized water vapor may revert back to a liquid state. Thus, at least certain types of compressor units may include a moisture separator that is positioned downstream of the after-cooler that is configured to remove liquid moisture from cooled, compressed gases.

Moisture separators often utilize swirl vanes to generate centrifugal forces that separate liquid moisture from compressed gas. Such moisture separators are often separate tubular structures that require both inlet piping for the delivery of un-dried compressed gas to the moisture separator, and outlet piping for the flow of dried compressed gas away from the moisture separator. Yet, the separate structure of the moisture separator and the requisite inlet and outlet tubing typically precludes moisture separators from being incorporated into other components of the compressor system.

Additionally, such cyclone style moisture separators typically need to be located at an elevation that is above that of the compression chamber. Yet, such elevated positioning of the moisture separator may result, when the compressor unit is not being operated, in liquid moisture that is trapped at least in the inlet piping of the separator flowing back toward, and possibly into, the compression chamber, which may adversely impact subsequent operation and/or performance of the compression chamber. Additionally, an additional support structure may be needed to attain the requisite elevated positioning of the moisture separator, which may both add to the cost and raise the center of gravity of the compressor unit.

BRIEF SUMMARY

An aspect of the present invention is an impact moisture separator for separating a liquid moisture from a compressed gas. The impact moisture separator includes a housing and a plurality of impact plates positioned within an inner region of the housing. The plurality of impact plates each have a plate portion and a plurality of vanes. The plurality of vanes extend through the plate portion and are configured to provide a passage for the flow of compressed gases. Additionally, a front portion of the plate portion is angularly offset from an adjacent lower inner surface of the housing by a plate tilt angle that is less than 90 degrees. Further, the plurality of vanes for each of the plurality of impact plates are offset from the plurality of vanes of the adjacent impact plate.

Another aspect of the present invention is an impact moisture separator for separating a liquid moisture from a compressed gas that includes a housing having an inner region, the inner region having a reservoir. The impact moisture separator also includes a plurality of impact plates that are positioned within the inner region downstream of at least one strut. The plurality of impact plates each have a plate portion and a plurality of vanes. The plurality of vanes are configured to provide a passage for the flow of compressed gases and extend beyond the plate portion. Additionally, the plurality of vanes for each of the plurality of impact plates are offset from the plurality of vanes of an adjacent impact plate of the plurality of impact plates.

Additionally, another aspect of the present invention is an impact moisture separator that is configured to separate coalesced liquid moisture from compressed gas that includes a housing having a plurality of inner surfaces, an inlet port, and an outlet port, the plurality of inner surfaces generally defining an inner region and a reservoir of the housing. The impact moisture separator also includes at least one strut that extends from at least a lower inner surface of the plurality of inner surfaces and is tilted toward the incoming flow of the compressed gas. The strut is also configured to disperse at least a portion of the compressed gas. Further, the impact moisture separator includes a plurality of impact plates that are positioned downstream of the at least one strut and are vertically tilted toward the incoming flow of compressed gas. Further, each of the plurality of impact plates have a plate portion and a plurality of vanes, the plurality of vanes projecting beyond both a front side and rear side of the plate portion. The plurality of vanes are configured to provide a pathway for the compressed gases. Additionally, the plurality of vanes for each of the plurality of impact plates are offset from the plurality of vanes of an adjacent impact plate. Further, at least the plurality of impact plates are oriented within the inner region to influence a generally downward flow of coalesced liquid moisture that has collected on the plurality of impact plates.

Other aspects of the present invention will become apparent by consideration of the detailed description and accompanying drawings.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIGS. 1-4 illustrate an impact moisture separator 10 that includes a housing 12 having one or more walls 14 that generally define an inner region 16. The inner region 16 is in fluid communication with both an inlet port 18 and an outlet port 20 of the housing 12. The inlet port 18 may be operably connected to tubing, piping, and/or other connections used in the delivery of un-dried compressed gas to the housing 12. According to the illustrated embodiment, the inlet port 18 is in fluid communication with an outlet port of an air-cooler of a compressor unit. The outlet port 20 of the impact moisture separator 10 may provide an outlet for dried compressed gas to flow out from the inner region 16, and thus exit the impact moisture separator 10.

Figure 4:
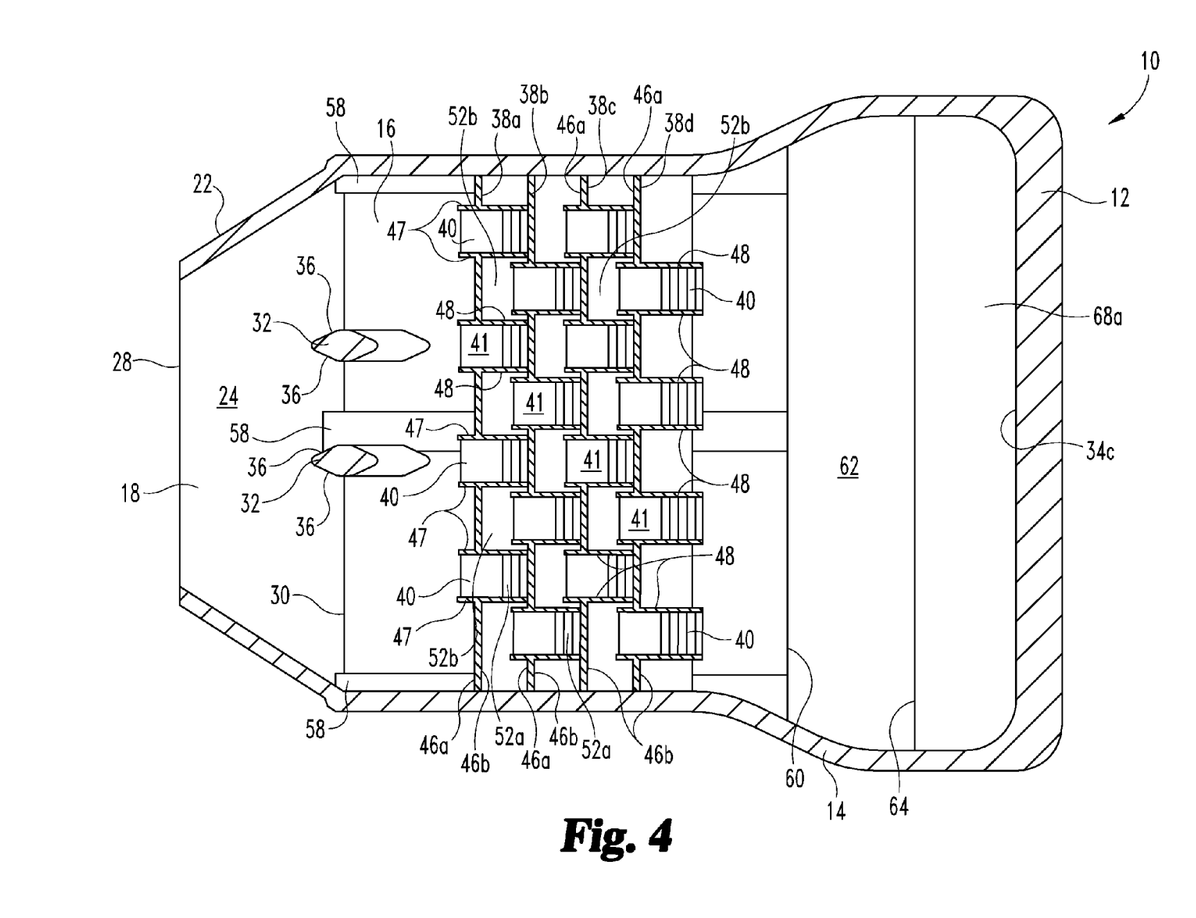
FIG. 4 illustrates a top side cross sectional view of the impact moisture separator shown in FIG. 1.

Referencing at least FIG. 4, according to certain embodiments, the inlet port 18 may include a sidewall 22 that generally defines a passageway 24. The sidewall 22 may have a variety of different shapes and configurations. For example, according to certain embodiments, the sidewall 22 may have a generally cylindrical shape. According to other embodiments, the sidewall 22 may have a generally tapered configuration wherein the passageway 24 has a smaller size, such as, for example, a diameter, at a first end 28 of the sidewall 22 than at a downstream, second end 30 of the sidewall 22. Such characteristics of the inlet port 18 may facilitate the connection of the inlet port 18 to piping used in the delivery of un-dried compressed gas to the impact moisture separator 10. Moreover, such a configuration may impact the flow characteristics of the incoming un-dried compressed gas, such as, for example, assisting in dispersing the incoming un-dried compressed gas into the inner region 16 and/or adjusting the velocity of the un-dried compressed gas that is passing through the inlet port 18.

The inner region 16 may also include one or more struts 32 that are positioned downstream of at least the first end 28 of the sidewall 22 in the inner region 16 of the housing 12. The struts 32 may be configured to precondition the flow of un-dried compressed gas upstream of a plurality of impact plates 38a-d. For example, according to certain embodiments, the struts 32 may be configured to improve the distribution of un-dried compressed gases in the inner region 16, so that, as the compressed gases approach the plurality of impact plates 38a-d, the flow of compressed gases is more evenly distributed or spread across the impact plates 38a-d. Moreover, the struts 32 may be configured to more evenly distribute the flow of compressed gases through vanes 40 of the impact plates 38a-d, and thereby prevent the flow of compressed gases from being concentrated toward a few, generally centrally located, vanes 40 of the impact plates 38-d.

According to the illustrated embodiment, the struts 32 may be two struts or columns that are positioned upstream of the impact plates 38a-d, and which may generally extend from a lower inner surface 34b of the housing 12 to an upper inner surface 34a of the housing 12 or, in the illustrated embodiment, to a portion of the sidewall 22 of the inlet port 18. Further, according to certain embodiments, one or more opposing sides 36 of the struts 32 may have generally curved, rounded, or airfoil shapes that may improve the flow characteristics of compressed gases downstream of the struts 32. However, the struts 32 may have a variety of other shapes, sizes, configurations, and orientations. Further, although the struts 32 in the illustrated embodiment are shown as being arranged in a side-by-side, generally vertically tilted orientation and at approximately an equal distance from at least the first end 28 of the sidewall 22 of the inlet port 18, the struts 32 may be arranged in a variety of different orientations and configurations. For example, according to certain embodiments, the struts 32 may have a staggered or offset orientation wherein one or more struts 32 may be located at least partially downstream from another, relatively adjacent strut 32, and/or have a horizontal or diagonal orientation.

The inner region 16 also houses one or more impact plates 38a-d that are positioned downstream of the struts 32. As shown in at least FIGS. 3-6, each impact plate 38a-d includes a plurality of vanes 40 that at least extend through a plate portion 42 of the associated impact plate 38a-d. The vanes 40 are configured to at least provide passages 41 for compressed gas to flow through the impact plate 38a-d. According to the illustrated embodiment, each vane 40 may also protrude or otherwise extend beyond front and rear sides 46a, 46b of the plate portion 42 of the impact plates 38a-d. Moreover, the impact plates 38a-d may include front and/or rear vane walls 47, 48 that extend from the plate portions 42 and which are configured to extend the length of the vanes 40 beyond one or more of the front and rear sides 46a, 46b of the plate portion 42 of the impact plates 38a-d.

Figure 3:
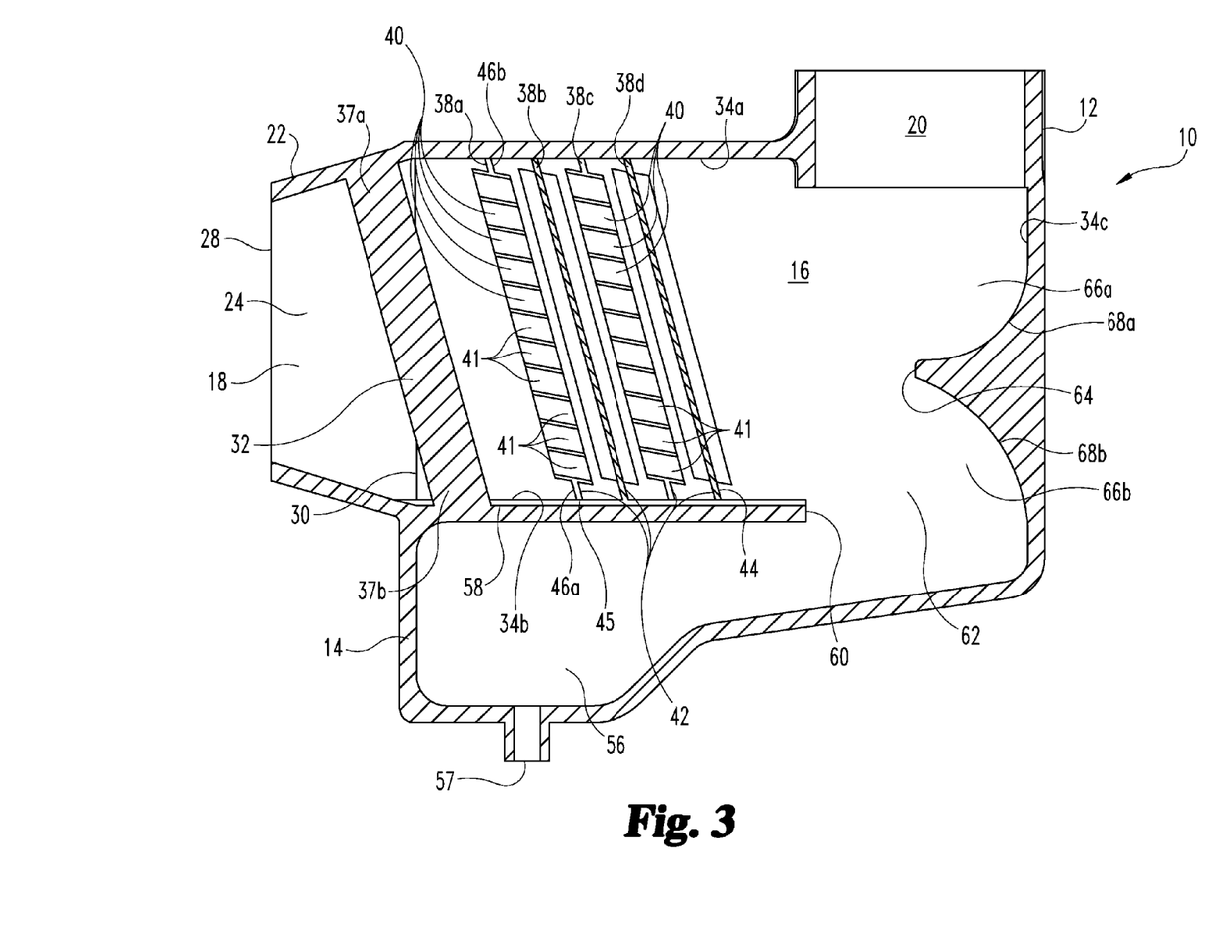
FIG. 3 illustrates a side cross sectional view of the impact moisture separator shown in FIG. 1.
Figure 5:
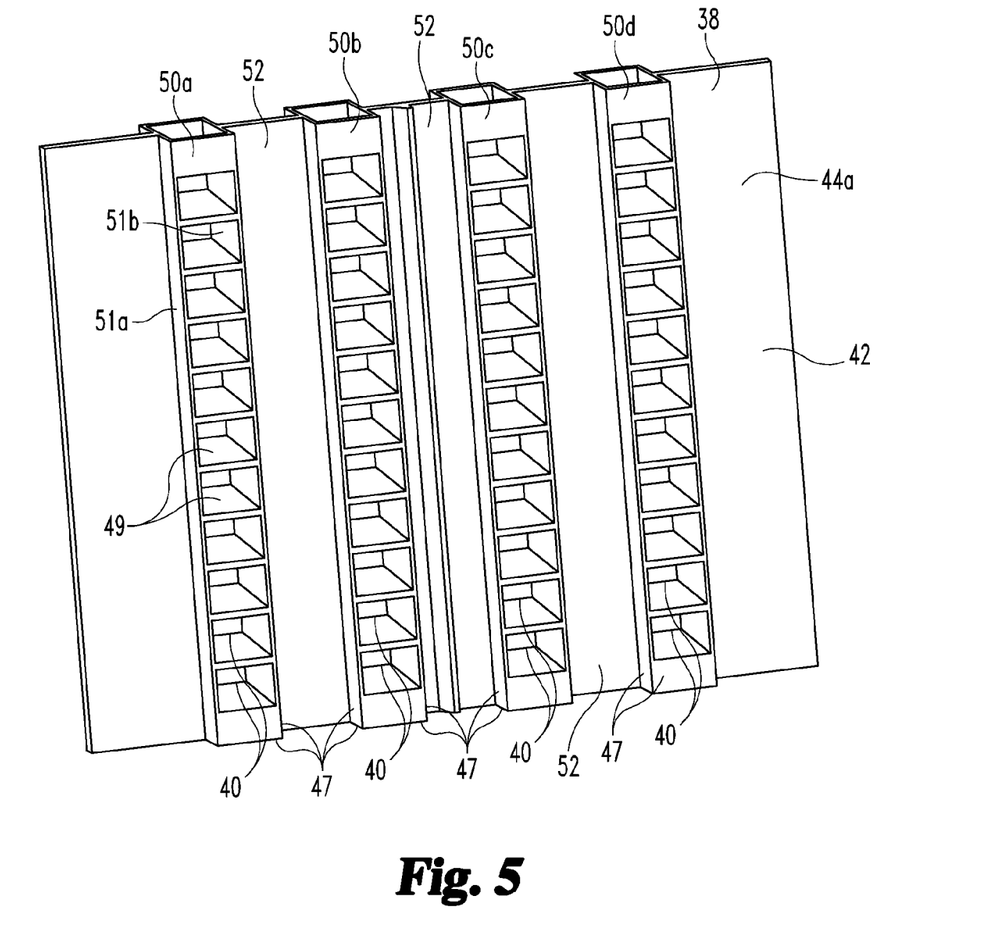
FIG. 5 illustrates a front perspective view of a moisture impact plate according to an illustrated embodiment of the present invention.

As shown, for example, by at least FIGS. 3 and 5, according to at least some embodiments, one or more vane walls 47, 48 may be shared by a plurality of vanes 40. For example, in the illustrated embodiment, vane walls 47, 48 may provide a divider 49 between at least two vertically adjacent vanes 40 of the same impact plate 38a-d. Further, according to certain embodiments, at least a portion of the vanes walls 47, 48 may provide opposing sidewalls 51a, 51b for a plurality of vanes 40. According to such embodiments, the vanes 40 may be arranged in one or more vane sets 50a-d. Such vane sets 50a-d may be arranged in a variety of different orientations and configurations, such as, for example, having an array configuration. For example, at least FIG. 5 illustrates an impact plate 38 having a plurality of vane sets 50a-d that are arranged in an array of four vane sets 50-d that each contain eleven rows of vanes 40. However, according to certain embodiments, at least one vane set 50a-d may have a different quantity, size, shape, and/or orientation of vanes 40 than that of at least another vane set 50a-d. Further, at least one vane 40 and/or vane set 50a-d may be separated from an adjacent vane 40 and/or vane set 50a-d, respectively, by a vane gap 52.

Figure 6:
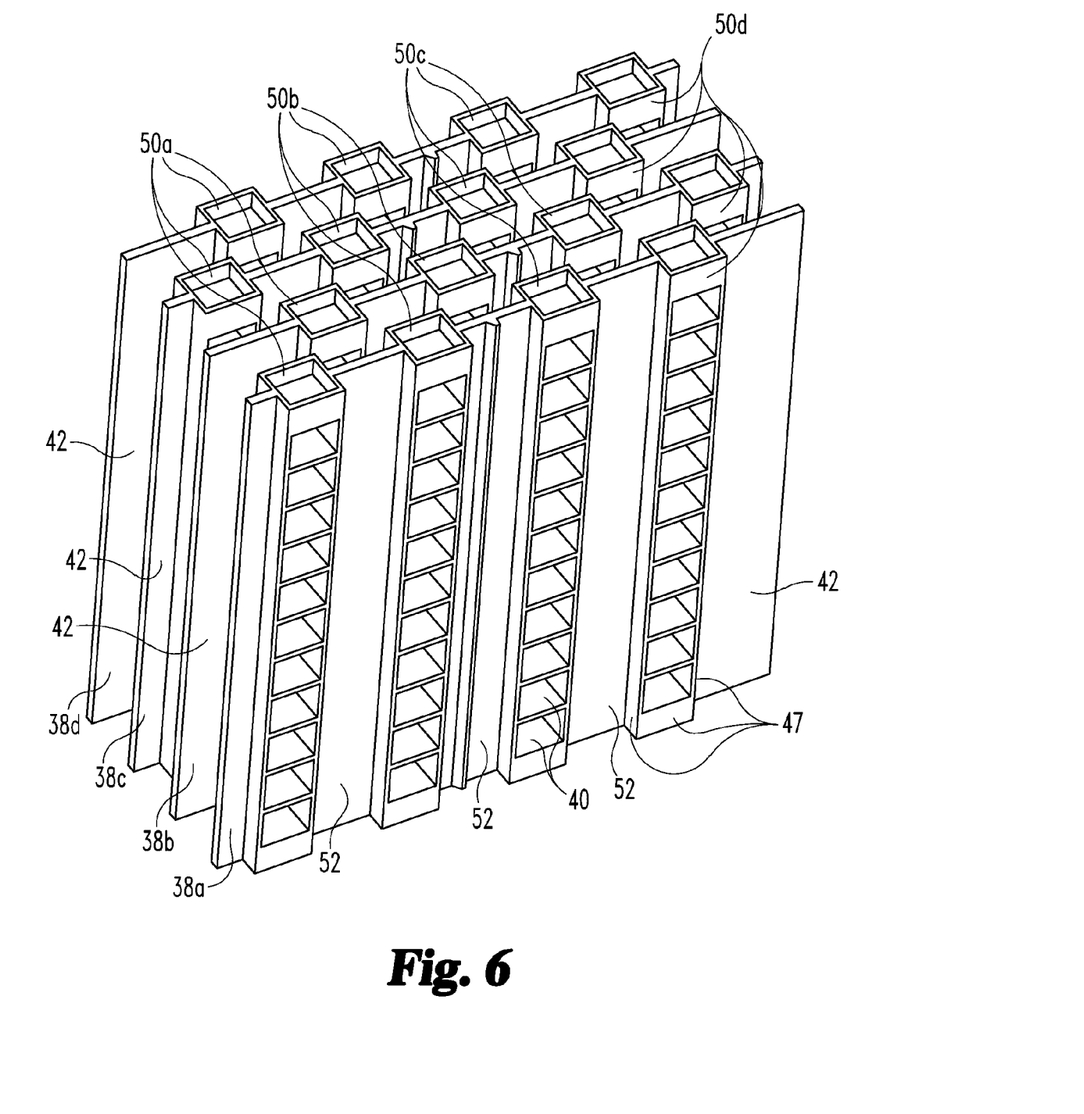
FIG. 6 illustrates a front perspective view of a plurality of moisture impact plates having openings arranged in a staggered orientation according to an embodiment of the present invention.

Referencing at least FIGS. 3, 4, and 6, the impact plates 38a-d may be arranged in a generally parallel orientation, with the vanes 40 of the impact plates 38a-c being offset from the vanes 40 of the successive, downstream impact plate 38b-d. Such offsetting of the vanes 40 may prevent or minimized compressed gases that exit a vane 40 of an impact plate 38a-c from flowing directly into and/or towards a vane 40 of the successive, downstream impact plate 38b-d. For example, the vanes 40 in the second impact plate 38b may be offset from both the vanes 40 of the upstream first impact plate 38a and the successive downstream third impact plate 38c. Similarly, the vanes 40 of the third impact plate 38c may also be offset from the vanes 40 of the successive, downstream fourth impact plate 38d.

As shown by at least FIG. 4, offsetting the vanes 40 of at least successive impact plates 38b-d allows compressed gas that exits the passageway 44 of a vane 40 to flow into or toward the gap portion 52 of the successive, downstream impact plate 38b-d, rather than flowing directly into an adjacent, downstream vane 40. For example, according to certain embodiments, rear vane walls 48 of an upstream first impact plate 38a may extend toward and/or into a downstream vane gap 52a that is provided between the front vane walls 47 of the adjacent, downstream second impact plate 38b. Similarly the front vane walls 47 of the downstream second impact plate 38b may extend toward and/or into an upstream vane gap 52b that is provided between the rear vane walls 48 of the adjacent, upstream first impact plate 38a. Additionally, according to the illustrated embodiment, the impact plates 38a-d may be oriented and configured in the inner region 16 such that the downstream vane gap 52a is in fluid communication with the upstream vane gap 52b.

During use of the illustrated impact moisture separator 10, un-dried compressed gas that flows through vanes 40 of the first impact plate 38a is directed by at least the associated rear vane wall 48 into and/or towards the adjacent downstream vane gap 52a between at least a portion of the front vane walls 47 of the downstream, second impact plate 38b, wherein at least a portion of the compressed gas may flow collide with, or otherwise impact the front side 46a of the second impact plate 38b. According to such embodiments, the compressed gas in the downstream vane gap 52a may then turn or be turned approximately 180 degrees from the front side 46a of plate portion 48 of the second impact plate 38b. Moreover, the compressed gas in a downstream channel gap 52a may flow towards an upstream vane gap 52b between the rear vane walls 48 of the upstream first impact plate 38a. Additionally, at least as portion of the compressed gas flowing into the upstream vane gap 52b may then flow into or otherwise impact the rear side 46b of the first impact plate 38a. Further, according to the illustrated embodiment, at least a portion of each upstream vane gap 52b is generally adjacent to a vane 40 of the second impact plate 38b. Thus, the compressed gas that flows to the upstream vane gap 52b may turn or be turned about 180 degrees in direction so as to flow through an adjacent vane 40 in the second impact plate 38b. In the illustrated embodiment, this flow pattern may be generally repeated as the compressed gas flows toward and through successive downstream impact plates 38c, 38d and generally toward the outlet port 20 of the housing 12.

The relatively rapid succession in which the compressed gas turns directions while flowing through the plurality of impact plates 38a-d, as well as the opportunity for the compressed gas to flow into or otherwise impact the impact plates 38b-d, may aid in the coalescence of liquid moisture that is contained in the compressed gas. Moreover, the relatively rapid succession in which compressed gas turns direction in the downstream and upstream vanes 52a, 52b, and the associated impact of compressed gas against impact plates 38a-d, may cause liquid moisture in the compressed gas, such as, for example water droplets, to collide and coalesce with one another. Further, at least a portion of the coalesced moisture droplets may form a relatively thin film of liquid moisture on at least the impact plates 38a-d. Further, as discussed below in more detail below, the impact plates 38a-d may be configured to influence the flow of compressed gases such that the compressed gases flow in a generally downward direction or incline. Such downward flow of the compressed gases, along with gravity, may influence the flow of the film of coalesced moisture that has collected on the impact plates 38a-d, as well as moisture that has coalesced in the compressed gases, down toward a lower inner surface 34b of the inner region 16. Further, the downward force of the compressed gases may also induce the flow of moisture that has collected on the lower inner surface 34b toward a water collection chamber or reservoir 56.

Figure 1:
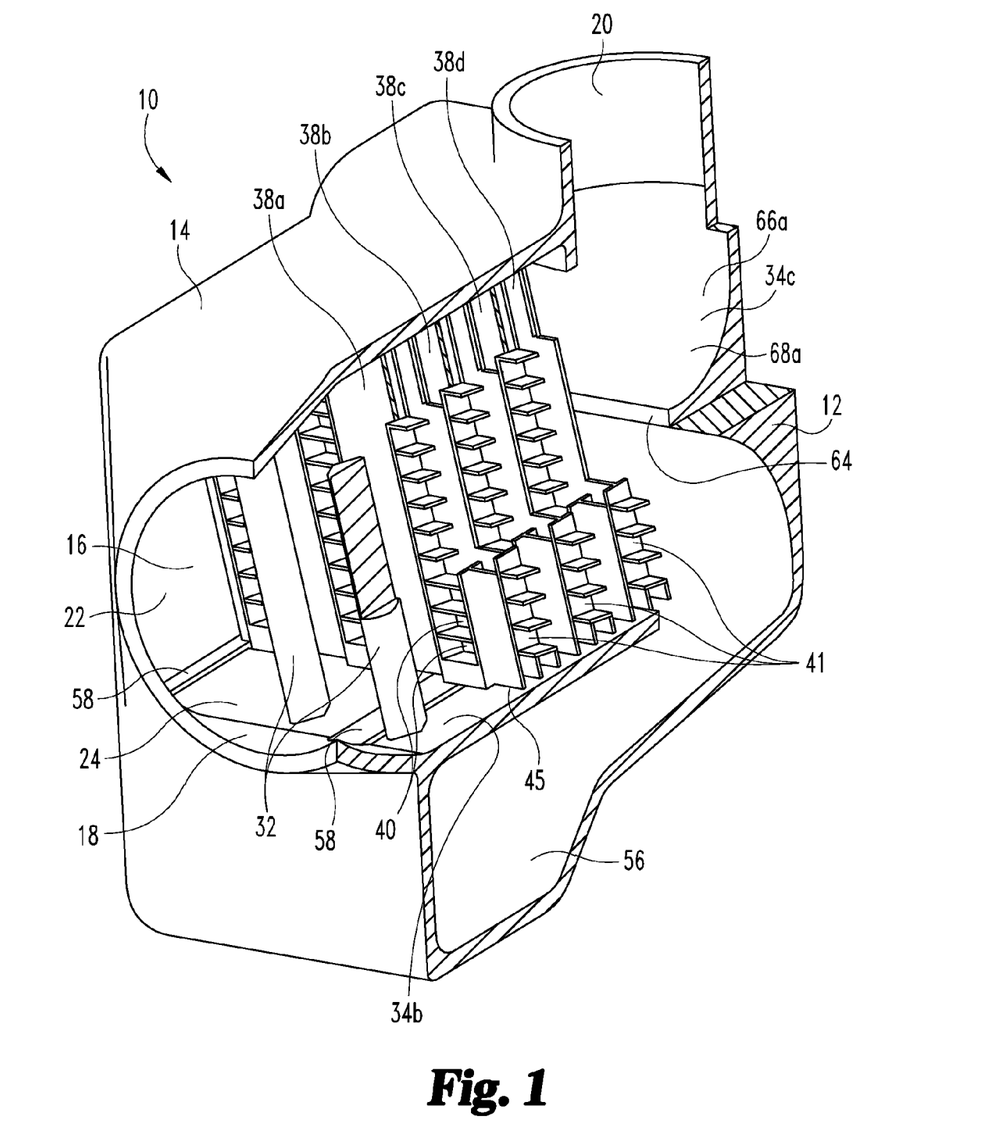
FIG. 1 illustrates a side perspective, partial cut-way view of an impact moisture separator according to an illustrated embodiment of the present invention.
Figure 2:
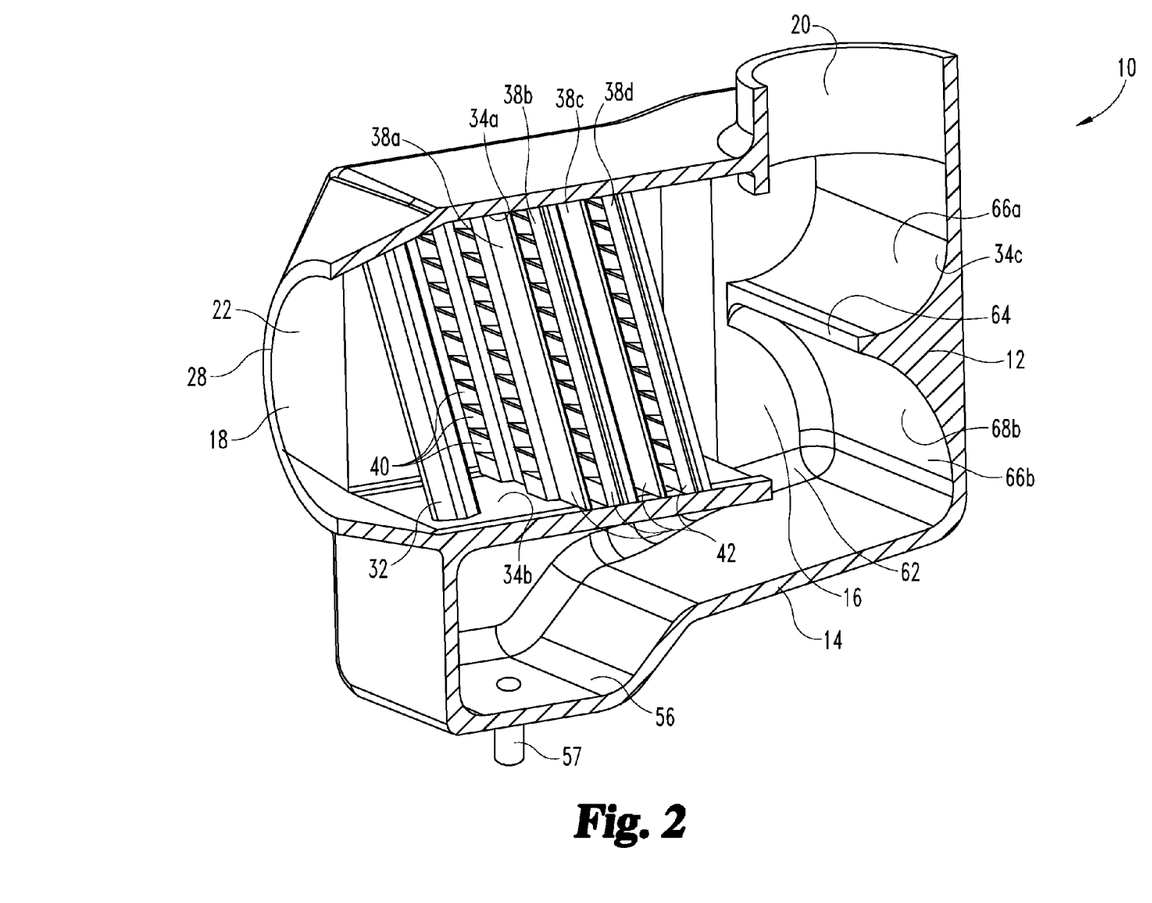
FIG. 2 illustrates a side perspective cutaway view of the impact moisture separator shown in FIG. 1.

Referencing FIGS. 1-3, in the illustrated embodiment, the reservoir 56 is configured for the collection and/or retention of at least a portion of the liquid moisture that is removed from the compressed gas in the inner region 16. For example, according to the illustrated embodiment, the reservoir 56 may be positioned beneath the lower inner surface 34b of the inner region 16. Further, the lower inner surface 34b may be configured to at least assist in delivering liquid moisture that has been removed from the compressed gases to the reservoir 56. For example, according to certain embodiments, the lower inner surface 34b may include one or more ledges 58 that support a portion of the bottom portion 45 of the impact plates 38a-d. The ledges 58 may be separated from adjacent ledges 58 by a space that provides an area through which separated liquid moisture may travel beneath the impact plates 38a-d and toward the reservoir 56. According to certain embodiments, the lower inner surface 34b may be angled other otherwise pitched so as to at least assist in the flow of collected moisture toward and entry location for the reservoir 56. Further, in the illustrated embodiment, the lower inner surface 34b may terminate at an end portion 60 that is separated from a rear inner surface 34c of the inner region 16 so as to provide an opening 62 for collected moisture to flow from the lower inner surface 34b and into the reservoir 56.

Additionally, as shown in FIGS. 2 and 3, according to certain embodiments, the reservoir 56 may be in fluid communication with a drain 57 that provides a pathway for the flow and/or removal of collected moisture from the reservoir 56. In the illustrated embodiment, the drain 57 may extend from a lower portion of the housing 12. According to certain embodiments, the drain 57 may be operably connected to a valve that controls the flow of moisture from the reservoir 56 and through the drain 57. Additionally, operation of the valve may be controlled in a number of manners, including, for example, via an electronic switch that actuates a motor or solenoid that is used in displacing the valve between open and closed positions.

According to the illustrated embodiment, an impinging surface 64 is positioned downstream of the plurality of impact plates 38a-d. The impinging surface 64 is configured to influence the flow of water moisture that has been separated from the compressed gas by the flow of the compressed gases through the impact plates 38a-d into the reservoir 56, as well as to prevent re-entrainment of collected water moisture into the flow stream of the compressed gases. In the illustrated embodiment, impinging surface 64 extends away from the rear inner surface 34c of the housing and toward the impact plates 38a-d so that the impinging surface 64 traverses across at least a portion of the flow path of the compressed gas within the inner region 16. Further, in the illustrated embodiment, the impinging surface 64 separates the rear inner surface 34c into upper and lower cavities 66a, 66b, with the upper and lower cavities 66a, 66b being generally defined by upper and lower wall portions 68a, 68b, respectively, of the rear inner surface 34c. The upper and lower wall portions 68a, 68b may have a variety of different shapes and configurations. In the illustrated embodiment, the upper and lower wall portions 68a, 68b include generally rounded portions that can at least assist in influencing the flow path of the compressed gases so as to facilitate the travel of water moisture collected from the impact plates 38a-d to the reservoir 56.

The impact plates 38a-d and/or struts 32 may be tilted toward and/or into the flow of un-dried compressed gas that is flowing through the inner region 16. Such a configuration may be used to influence the flow patterns of the compressed gas so that the flow stream of the compressed gas in the inner region 16 may be used to push liquid moisture in the compressed gas, and/or liquid moisture that has been removed from the compressed gas, toward the lower inner surface 34b and/or the reservoir 56. For example, as shown by at least FIG. 3, according to certain embodiments, upper portions 44a of the impact plates 38a-d may be positioned at a location along a portion of the upper inner surface 34a of the housing 12 that is relatively further upstream than the location at which the bottom portions 44b of the impact plates 38a-d are positioned along the lower surface 34b of the housing 12 so that the impact plates 38a-d are tilted toward the incoming flow of un-dried compressed gases. Further, according to certain embodiments, the angle at which the impact plates 38a-d are tilted into the incoming flow of un-dried compressed gases may be generally the same for each impact plate 38a-d so that the impact plates 38a-d are arranged in an generally parallel configuration. Additionally, according to certain embodiments, the struts 32 may also have a similar angled tilted orientation, such as, for example, a top portion 37a of the struts 32 being located at a position that is generally upstream of the location of a bottom portion 37b of the strut 32. The degree and/or direction at which the impact plates 38a-d and/or struts 32 are tilted may be based at least in part on the resulting flow characteristics that are to be imparted onto the compressed gases in the inner region 16. For example, in the illustrated embodiments, the angular orientation of the impact plates 38a-d and/or struts 32 may influence the compressed gases to flow in a downward direction that assists liquid moisture that has collected on the impact plates 38a-d, collected on the lower inner surface 34b of the housing, or that has otherwise been separated from the compressed gases in moving toward the lower inner surface 34b and/or the reservoir 56 of the housing 12. However, embodiments of the present invention also reduce or minimize the drag force associated with the compressed gases striking the adjacent, downstream impact plate 38b-d by also angularly offsetting the vanes 40 so as reduce or minimize the impingement angle while also influencing the compressed gases to flow in a generally downward direction or incline.

Figure 7:
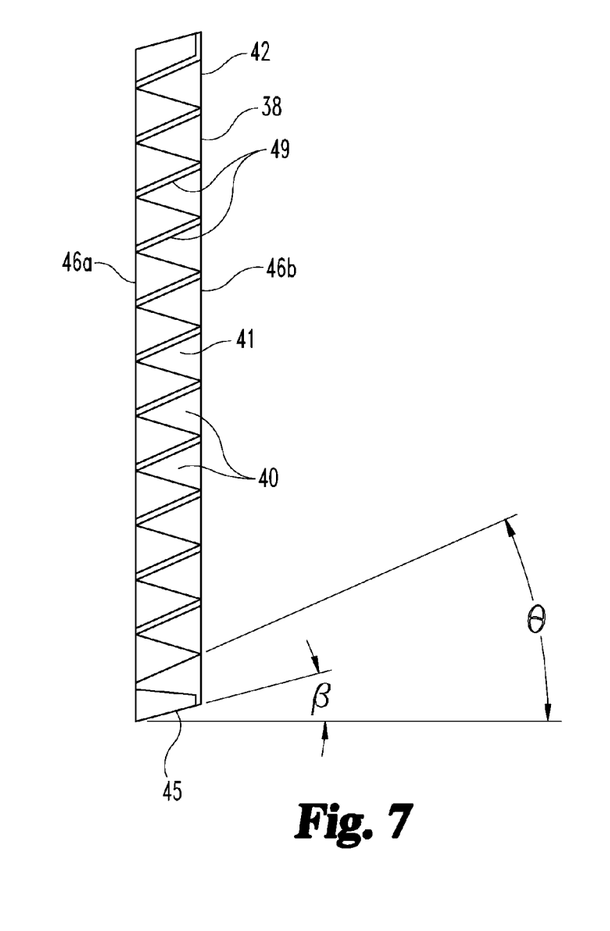
FIG. 7 illustrates a side cross sectional schematic of an impact plate according to an embodiment of the present invention.

For example, FIG. 7 illustrates a schematic representation of an impact plate 38 according to an illustrated embodiment of the present invention. As shown, according to certain embodiments, a bottom portion 45 of the impact plate 38 is not perpendicular to the front and rear sides 46a, 46b of the plate portion 42, but instead is angularly offset by a base tilt angle (β). Thus, when the bottom portion 45 of the impact plate 38 is positioned against the lower inner surface 34b of the housing 12, the front and rear sides 46a, 46b of at least the plate portion 42 are not perpendicular to the lower inner surface 34b, but instead the impact plate 38 is generally tilted within the inner region 16. According to certain embodiments, the base tilt angle (β) is around 15 degrees.

Further, as the impact plate 38 in the illustrated embodiment is tilted toward the flow of incoming un-dried compressed gases, the impact plate 38 is positioned such that the front side 46a of at least the plate portion 42 of the impact plate 38 is tilted, by the angular orientation of the bottom portion 45, at a plate tilt angle (α) relative to the lower inner surface 34b. In the illustrated embodiment, the plate tilt angle (α) may be generally determined by the equation:

$$\alpha = 90° - \beta \tag{Eq. 1}$$

Thus, according to the illustrated embodiment, wherein the base tilt angle (β) is 15 degrees, the plate tilt angle (α) is 75 degrees. Additionally, according to certain embodiments, the struts 32 may also be tilted toward the flow of incoming compressed gas at generally the same angle as the plate tilt angle.

Additionally, the vanes 40 may also be tilted relative to the lower inner surface 34b of the housing 12 such that the passage 41 of the vane 40 through which compressed gases flow is not parallel to the lower inner surface 34b of the housing 12. Further, according to certain embodiments, the vanes 40 are tilted at an vane angle (θ) such that the vanes 40 are not parallel to the bottom portion 45 of the of the impact plate 38. For example, according to certain embodiments, the vane angle (θ) is around 25 degrees.

Figure 8:
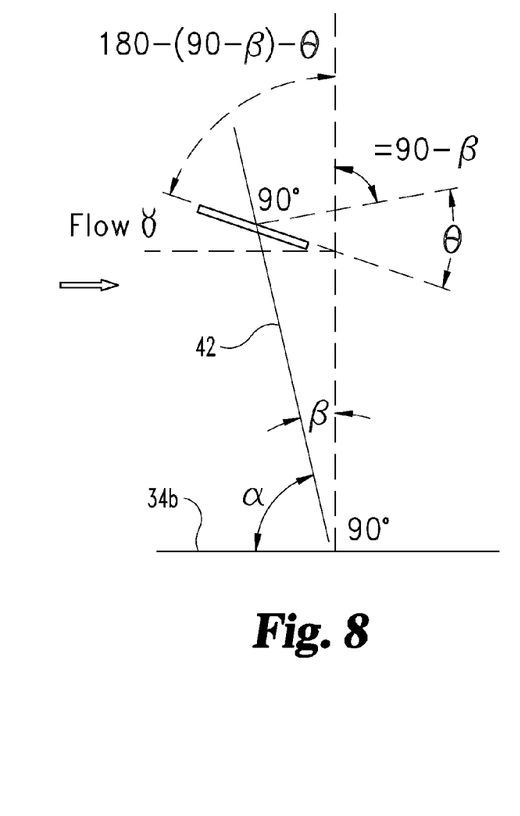
FIG. 8 illustrates a vector diagram of illustrating the impact a base tilt angle, plate tilt angle, and a vane tilt angle may have on the impingement angle at which compressed gas may strike the adjacent, downstream impact plate according to an illustrated embodiment of the present invention.

FIG. 8 is a vector diagram illustrating the impingement angle (γ) at which compressed gases that flow through an impact plate 38a-c will collide with a subsequent, adjacent downstream impact plate 38b-d. As shown in FIG. 8, the impingement angle in the illustrated embodiment may generally equal:

$$\gamma = 90° - [180° - (90° - \beta) - \theta] \tag{Eq. 2a}$$

or $$\gamma = \theta - \beta \tag{Eq. 2b}$$

In the illustrated embodiment, as the base tilt angle (β) is about 15 degrees, and the vane angle (θ) is about 25 degrees, the impingement angle (γ) is about 10 degrees.

The impact plates 38a-d may be configured to provide a variety of different impingement angles (γ). For example, according to certain embodiments, the impingement angle (γ) may around 0 degrees to 30 degrees. However, according to certain embodiments, the selected impingement angle (γ) may be based on obtaining a balance attaining sufficient downward forces by the compressed gases on moisture that has collected on both the impact plates 38a-d and the inner lower surface 34b, while minimizing the resulting drag force that is imparted on the compressed gases from the compressed gases striking the impact plate 38b-d. For example, the relationship of the drag force to the impingement angle (γ) may be expressed as follows:

$$F_d = C_d * \tfrac{1}{2} \rho V^2 A \tag{Eq. 3}$$

$$A = L \sin(\gamma) * W \tag{Eq. 4}$$

where L is the length of the vane 40, W is the width across the vane 40, $C_d$ is the drag coefficient, p is the density of the compressed gas, and V is the velocity of the compressed gases. As indicated by at Eqs. 3 and 4, as the impingement angle (γ) increases, the associated drag force imparted on the compressed gases also increases. Thus, by adjusting the vane angle (θ) in relation to the base tilt angle (β), the impact plates 38a-d are configured to minimize the angle at which compressed gases strike the adjacent, downstream impact plate 38b-d, and thereby minimize the drag force imparted on the compressed gases.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An impact moisture separator for separating a liquid moisture from a compressed gas, the impact moisture separator comprising:
a housing having an inner region; and
a plurality of impact plates arranged in series within the inner region, the plurality of impact plates each having a plate portion and a plurality of vanes, the plate portion having a front side, a rear side, a base portion, and an upper portion, the front side being upstream, and on an opposite side of the plate portion, of the rear side, the upper and base portions being on opposing sides of the plate portion, the base portion being proximally adjacent to a lower inner surface of the housing,
the plurality of vanes configured to provide a passage for the flow of compressed gas, the passage defined by opposing vane surfaces to convey the flow of compressed gas traversing the passage in a direction extending along a decline from at least the front side to the rear side of the plate portion, the decline configured to direct the flow of compressed gas in a direction that influences the flow of coalesced liquid moisture that has collected on the front side of the plate portion of the subsequent impact plate of the plurality of impact plates toward the base portion of the subsequent impact plate,
the front side of the plate portion being angularly offset from an adjacent portion of the lower inner surface of the housing by a plate tilt angle that is less than 90 degrees such that the front portion of the plate portion is positioned upstream relative to a location of an opposing lower portion of the plate portion,
the plurality of vanes for each of the plurality of impact plates are offset from the plurality of vanes of an adjacent impact plate of the plurality of impact plates to provide an impact of at least a portion of the flow of compressed gas flowing through the plurality of vanes with the front side of the plate portion of the adjacent impact plate.

2. The impact moisture separator of claim 1, wherein a base portion of the plate portion is not perpendicular to at least the front side of the plate portion.

3. The impact plate moisture separator of claim 2, wherein the decline of the passage is along a vane angle that is larger than a base tilt angle of the base portion.

4. The impact plate moisture separator of claim 3, wherein the vane angle and the base tilt angle are configured to influence the compressed gas flowing through the plurality of vanes to flow in a generally downward direction.

5. The impact plate moisture separator of claim 4, wherein the vane angle and the base tilt angle are configured for the compressed gas to strike an adjacent impact plate of the plurality of impact plates at an impingement angle between 0 degrees and 30 degrees, inclusive.

6. The impact moisture separator of claim 4, wherein each of the plurality of vanes include a front vane wall and a rear vane wall, the front vane wall extending a length of the passage beyond the front side of the plate portion, and the rear vane wall extending the length of the passage beyond a rear side of the plate portion, at least the rear vane wall configured to direct the flow of compressed gas passing through the passage into the plate portion of an adjacent impact plate of the plurality of impact plates.

7. An impact moisture separator for separating a liquid moisture from a compressed gas, the impact moisture separator comprising:
a housing having an inner region; and
a plurality of impact plates positioned within the inner region, the plurality of impact plates each having a plate portion and a plurality of vanes, the plurality of vanes each configured to provide a passage defined by neighboring vane surfaces to convey the compressed gas traversing the passage in a direction along a decline for the flow of the compressed gas through at least the plate portion, the decline configured to influence the flow of coalesced liquid moisture from the flow of compressed gas that has collected on a front portion of a plate portion of a subsequent impact plate of the plurality of impact plates toward a base portion of the subsequent impact plate,
the front portion of the plate portion being angularly offset from an adjacent lower inner surface of the housing by a plate tilt angle that is less than 90 degrees, and wherein the plurality of vanes for each of the plurality of impact plates are offset from the plurality of vanes of an adjacent impact plate of the plurality of impact plates,
wherein each of the plurality of vanes include a front vane wall and a rear vane wall, the front vane wall extending a length of the passage beyond a front side of the plate portion, and wherein the front vane wall of at least a portion of the plurality of vanes extends toward an upstream gap between the rear vane wall of two or more of the plurality of vanes of an adjacent, upstream impact plate of the plurality of impact plates, the rear vane wall configured to direct at least a portion of compressed gas flowing through the passage into impact with the front portion of the adjacent impact plate.

8. An impact moisture separator for separating a liquid moisture from a compressed gas, the impact moisture separator comprising:
a housing having an inner region, the inner region including a reservoir;
at least one strut positioned within the inner region and in a path of incoming flow of the compressed gas; and
a plurality of impact plates arranged in series within the inner region downstream of the at least one strut, the plurality of impact plates each having a plate portion and a plurality of vanes, the plurality of vanes configured to provide a passage for the flow of the compressed gas, the passage defined by adjacent vane surfaces to convey the flow of compressed gas traversing the passage in a direction extending along a decline from at least a front side to a rear side of the plate portion, the decline configured to direct the flow of compressed gas in a direction that influences the flow of coalesced liquid moisture from the flow of compressed gas that has collected on the front side of the plate portion of the subsequent impact plate of the plurality of impact plates toward a base portion of the subsequent impact plate, the plurality of vanes for each of the plurality of impact plates being offset from the plurality of vanes of an adjacent impact plate of the plurality of impact plates and oriented to provide an impact of at least a portion of the flow of compressed gas flowing through the plurality of vanes with a front side of the plate portion of the adjacent impact plate, and further wherein the plurality of impact plates are tilted within the inner region generally toward the flow of incoming compressed gas to influence the compressed gas flowing through the housing in a generally downward direction.

9. The impact moisture separator of claim 8, wherein the plurality of impact plates are tilted within the inner region by a plate tilt angle that is less than 90 degrees.

10. The impact moisture separator of claim 9, wherein the at least one strut is tilted in the same general direction as the plurality of impact plates within the inner region.

11. The impact moisture separator of claim 10, wherein only a portion of the base portion of the plate portion of the plurality of impact plates abuts a lower inner surface of the housing to define a space for liquid moisture to travel along the lower inner surface and toward the reservoir.

12. The impact moisture separator of claim 10, wherein the housing further includes an impinging surface, the impinging surface extending from an inner rear surface of the housing and is positioned to traverse across at least a portion of the flow path of the compressed gas, the impinging surface configured to at least prevent re-entrainment of water-moisture collected in the reservoir.

13. The impact moisture separator of claim 12, wherein the plurality of impact plates are arranged within the inner region such that the passage of the plurality of vanes has a generally downward incline relative to a lower inner surface of the housing.

14. The impact moisture separator of claim 12, wherein the base portion that abuts against at least a portion of a lower inner surface of the housing, the base portion extending between the front and rear sides of the plate portion having a base tilt angle that is larger than 0 degrees and less than an angle of decline at which the passageway extends from the front to the rear side.

15. An impact moisture separator configured to separate coalesced liquid moisture from compressed gas, the impact moisture separator comprising:
a housing having a plurality of inner surfaces, an inlet port, and an outlet port, the plurality of inner surfaces generally defining an inner region and a reservoir of the housing;
at least one strut extending from at least a lower inner surface of the plurality of inner surfaces and tilted toward the incoming flow of the compressed gas, the at least one strut configured to disperse at least a portion of the compressed gas;
a plurality of impact plates positioned downstream of the at least one strut, the plurality of impact plates being vertically tilted toward the incoming flow of compressed gas, each of the plurality of impact plates having a plate portion and a plurality of vanes, the plurality of vanes projecting beyond both a front side and a rear side of the plate portion, the plurality of vanes configured to provide a pathway formed by opposing vane surfaces to convey the flow of compressed gas traversing the passage in a direction along a decline, the decline configured to direct the flow of compressed gas in a generally downward direction that influences the flow of coalesced liquid moisture from the flow of compressed gas that has collected on the front side of the plate portion of the subsequent impact plate of the plurality of impact plates toward a base portion of the subsequent impact plate,
wherein the plurality of vanes for each of the plurality of impact plates are offset from the plurality of vanes of an adjacent impact plate of the plurality of impact plates and oriented to provide an impact of at least a portion of the flow of compressed gas flowing through the plurality of vanes with the front side of the plate portion of the adjacent impact plate.

16. The impact moisture separator of claim 15, wherein each of the plurality of impact plates are tilted within the inner region toward the incoming flow of compressed gas by a plate tilt angle that is less than 90 degrees.

17. The impact moisture separator of claim 16, wherein the decline of the passage is along a vane angle that is larger than a base tilt angle of the base portion of the impact plate.

18. The impact moisture separator of claim 16, wherein each of the plurality of vanes are offset from at least another vane of the plurality of vanes to provide a vane gap, and wherein the plurality of vanes of at least one of the plurality of impact plates extends toward the vane gap of another, adjacent impact plate of the plurality of impact plates, and wherein the pathway is configured to direct the flow of compressed gas into impact with a portion of the front side of the adjacent impact plate that is adjacent to the vane gap.

19. The impact moisture separator of claim 18, wherein the housing further includes an impinging surface, the impinging surface extending from an inner rear surface of the plurality of inner surfaces and is positioned to traverse across at least a portion of the flow path of the compressed gas, the impinging surface configured to at least prevent re-entrainment of collected liquid moisture into the compressed gas.

20. The impact moisture separator of claim 19, wherein the impinging surface is separated from the lower inner surface to provide an opening to the reservoir.

* * * * *